United States Patent
Long (10) Patent No.: US 8,525,955 B2
(45) Date of Patent: Sep. 3, 2013

(54) HEATER FOR LIQUID CRYSTAL DISPLAY

(75) Inventor: Ding Hua Long, Shenzhen (CN)

(73) Assignee: Multek Display (Hong Kong) Limited, Hong Kong (HK)

( * ) Notice: Subject to any disclaimer, the term of this patent is extended or adjusted under 35 U.S.C. 154(b) by 58 days.

(21) Appl. No.: 13/362,310

(22) Filed: Jan. 31, 2012

(65) Prior Publication Data

US 2013/0194523 A1    Aug. 1, 2013

(51) Int. Cl.
*G02F 1/1347* (2006.01)
(52) U.S. Cl.
USPC .......................................................... 349/82
(58) Field of Classification Search
USPC .......................................................... 349/82
See application file for complete search history.

(56) References Cited

U.S. PATENT DOCUMENTS

| | | |
|---|---|---|
| 4,550,221 A | 10/1985 | Mabusth |
| 5,062,198 A | 11/1991 | Sun |
| 5,379,057 A | 1/1995 | Clough et al. |
| 5,459,463 A | 10/1995 | Gruaz et al. |
| 5,488,204 A | 1/1996 | Mead et al. |
| 5,495,077 A | 2/1996 | Miller et al. |
| 5,543,588 A | 8/1996 | Bisset et al. |
| 5,543,590 A | 8/1996 | Gillespie et al. |
| 5,543,592 A | 8/1996 | Gaultier et al. |
| 5,650,597 A | 7/1997 | Redmayne |
| 5,675,362 A | 10/1997 | Clough et al. |
| 5,730,165 A | 3/1998 | Philipp |
| 5,825,352 A | 10/1998 | Bisset et al. |
| 5,841,078 A | 11/1998 | Miller et al. |
| 5,854,450 A | 12/1998 | Kent |
| 5,854,625 A | 12/1998 | Frisch et al. |
| 5,861,583 A | 1/1999 | Schediwy et al. |
| 5,880,411 A | 3/1999 | Gillespie et al. |
| 5,920,310 A | 7/1999 | Faggin et al. |
| 5,940,065 A | 8/1999 | Babb et al. |
| 5,943,052 A | 8/1999 | Allen et al. |
| 6,091,406 A | 7/2000 | Kambara et al. |
| 6,188,391 B1 | 2/2001 | Seely et al. |
| 6,236,391 B1 | 5/2001 | Kent et al. |
| 6,288,707 B1 | 9/2001 | Philipp |

(Continued)

FOREIGN PATENT DOCUMENTS

| CN | 1838151 A | 9/2006 |
|---|---|---|
| CN | 101122839 A | 2/2008 |

(Continued)

OTHER PUBLICATIONS

Touchscreenguide.com (http://www.touchscreenguide.com/touchscreen/res.html), as printed from the internet on Oct. 28, 2011, 1 pg.

(Continued)

*Primary Examiner* — Phu Vu
(74) *Attorney, Agent, or Firm* — Marsh Fischmann & Breyfogle LLP (57) ABSTRACT

A heater for a display such as a liquid crystal display (LCD). The heater includes a transparent film, a transparent conductive layer formed on a surface of the transparent film, and an optically clear adhesive (OCA) disposed over the conductive layer. The heater may be laminated directly to a rear transparent (e.g., glass) plate of an LC cell of the LCD using the OCA in a manner that is substantially free of air gaps or bubbles between the heater and the LC cell. Front and rear polarizers may be respectively disposed on outside surfaces of the LC cell and the heater.

20 Claims, 6 Drawing Sheets

(56) References Cited

U.S. PATENT DOCUMENTS

| | | |
|---|---|---|
| 6,297,811 B1 | 10/2001 | Kent et al. |
| 6,373,474 B1 | 4/2002 | Katabami |
| 6,379,509 B2 | 4/2002 | Choi et al. |
| 6,380,929 B1 | 4/2002 | Platt |
| 6,380,931 B1 | 4/2002 | Gillespie et al. |
| 6,414,671 B1 | 7/2002 | Gillespie et al. |
| 6,441,809 B2 | 8/2002 | Kent et al. |
| 6,452,514 B1 | 9/2002 | Philipp |
| 6,466,036 B1 | 10/2002 | Philipp |
| 6,488,981 B1 | 12/2002 | Richter et al. |
| 6,492,979 B1 | 12/2002 | Kent et al. |
| 6,504,530 B1 | 1/2003 | Wilson et al. |
| 6,504,583 B2 | 1/2003 | Li et al. |
| 6,506,983 B1 | 1/2003 | Babb et al. |
| 6,535,200 B2 | 3/2003 | Philipp |
| 6,549,193 B1 | 4/2003 | Huang et al. |
| 6,555,235 B1 | 4/2003 | Aufderheide et al. |
| 6,587,097 B1 | 7/2003 | Aufderheide et al. |
| 6,723,929 B2 | 4/2004 | Kent |
| 6,738,051 B2 | 5/2004 | Boyd et al. |
| 6,750,852 B2 | 6/2004 | Gillespie et al. |
| 6,781,579 B2 | 8/2004 | Huang et al. |
| 6,784,873 B1 | 8/2004 | Boesen et al. |
| 6,809,280 B2 | 10/2004 | Divigalpitiya et al. |
| 6,819,316 B2 | 11/2004 | Schulz et al. |
| 6,825,833 B2 | 11/2004 | Mulligan et al. |
| 6,842,171 B2 | 1/2005 | Richter et al. |
| 6,856,259 B1 | 2/2005 | Sharp |
| 6,904,570 B2 | 6/2005 | Foote et al. |
| 6,927,761 B2 | 8/2005 | Badaye et al. |
| 6,943,705 B1 | 9/2005 | Bolender et al. |
| 6,961,049 B2 | 11/2005 | Mulligan et al. |
| 6,970,160 B2 | 11/2005 | Mulligan et al. |
| 6,977,646 B1 | 12/2005 | Hauck et al. |
| 6,993,607 B2 | 1/2006 | Philipp |
| 7,000,474 B2 | 2/2006 | Kent |
| 7,006,081 B2 | 2/2006 | Kent et al. |
| 7,030,860 B1 | 4/2006 | Hsu et al. |
| 7,061,475 B2 | 6/2006 | Kent |
| 7,102,621 B2 | 9/2006 | Roberts |
| 7,109,976 B2 | 9/2006 | Cobian |
| 7,109,978 B2 | 9/2006 | Gillespie et al. |
| 7,129,935 B2 | 10/2006 | Mackey |
| 7,148,704 B2 | 12/2006 | Philipp |
| 7,148,882 B2 | 12/2006 | Kamrath et al. |
| 7,151,532 B2 | 12/2006 | Schulz |
| 7,154,481 B2 | 12/2006 | Cross et al. |
| 7,158,122 B2 | 1/2007 | Roberts |
| 7,176,897 B2 | 2/2007 | Roberts |
| 7,176,902 B2 | 2/2007 | Peterson, Jr. et al. |
| 7,183,948 B2 | 2/2007 | Roberts |
| 7,190,350 B2 | 3/2007 | Roberts |
| 7,190,352 B2 | 3/2007 | Ling et al. |
| 7,196,694 B2 | 3/2007 | Roberts |
| 7,202,859 B1 | 4/2007 | Speck et al. |
| 7,212,189 B2 | 5/2007 | Shaw et al |
| 7,227,538 B2 | 6/2007 | Geaghan et al. |
| 7,236,161 B2 | 6/2007 | Geaghan et al. |
| 7,253,643 B1 | 8/2007 | Seguine |
| 7,253,809 B2 | 8/2007 | Boyd et al. |
| 7,254,775 B2 | 8/2007 | Geaghan et al. |
| 7,256,714 B2 | 8/2007 | Philipp |
| 7,277,087 B2 | 10/2007 | Hill et al. |
| 7,279,647 B2 | 10/2007 | Philipp |
| 7,295,190 B2 | 11/2007 | Philipp |
| 7,298,367 B2 | 11/2007 | Geaghan et al. |
| 7,303,809 B2 | 12/2007 | Choi et al. |
| 7,307,624 B2 | 12/2007 | Geaghan et al. |
| 7,315,300 B2 | 1/2008 | Hill et al. |
| 7,327,352 B2 | 2/2008 | Keefer et al. |
| 7,339,579 B2 | 3/2008 | Richter et al. |
| 7,515,140 B2 | 4/2009 | Philipp |
| 7,821,425 B2 | 10/2010 | Philipp |
| 7,821,502 B2 | 10/2010 | Hristov |
| 7,825,905 B2 | 11/2010 | Philipp |
| 7,903,092 B2 | 3/2011 | Philipp |
| 7,932,898 B2 | 4/2011 | Philipp et al. |
| 7,945,297 B2 | 5/2011 | Philipp |
| 7,969,330 B2 | 6/2011 | Philipp |
| 2001/0026330 A1 | 10/2001 | Oh |
| 2002/0030666 A1 | 3/2002 | Philipp |
| 2002/0145593 A1 | 10/2002 | Boyd et al. |
| 2002/0191029 A1 | 12/2002 | Gillespie et al. |
| 2003/0001826 A1 | 1/2003 | Richter et al. |
| 2003/0095111 A1 | 5/2003 | Song et al. |
| 2003/0103043 A1 | 6/2003 | Mulligan et al. |
| 2003/0132922 A1 | 7/2003 | Philipp |
| 2003/0137498 A1 | 7/2003 | Huang et al. |
| 2003/0184523 A1 | 10/2003 | Badaye et al. |
| 2003/0205450 A1 | 11/2003 | Divigalpitiya et al. |
| 2004/0008129 A1 | 1/2004 | Philipp |
| 2004/0061687 A1 | 4/2004 | Kent et al. |
| 2004/0100448 A1 | 5/2004 | Moshrefzadeh |
| 2004/0104826 A1 | 6/2004 | Philipp |
| 2004/0135773 A1 | 7/2004 | Bang et al. |
| 2004/0178997 A1 | 9/2004 | Gillespie et al. |
| 2004/0188150 A1 | 9/2004 | Richard et al. |
| 2004/0189882 A1 | 9/2004 | Jeong et al. |
| 2004/0252109 A1 | 12/2004 | Trent, Jr. et al. |
| 2005/0024341 A1 | 2/2005 | Gillespie et al. |
| 2005/0035953 A1 | 2/2005 | Woolley et al. |
| 2005/0041018 A1 | 2/2005 | Philipp |
| 2005/0052429 A1 | 3/2005 | Philipp |
| 2005/0078027 A1 | 4/2005 | Philipp |
| 2005/0110766 A1 | 5/2005 | Kent et al. |
| 2005/0110767 A1 | 5/2005 | Gomes et al. |
| 2005/0162408 A1 | 7/2005 | Martchovsky |
| 2005/0174335 A1 | 8/2005 | Kent et al. |
| 2005/0179673 A1 | 8/2005 | Philipp |
| 2005/0246459 A1 | 11/2005 | Philipp |
| 2005/0260338 A1 | 11/2005 | Chien |
| 2006/0038793 A1 | 2/2006 | Philipp |
| 2006/0092142 A1 | 5/2006 | Gillespie et al. |
| 2006/0097991 A1 | 5/2006 | Hotelling et al. |
| 2006/0132453 A1 | 6/2006 | Boyd et al. |
| 2006/0132462 A1 | 6/2006 | Geaghan |
| 2006/0139340 A1 | 6/2006 | Geaghan |
| 2006/0187214 A1 | 8/2006 | Gillespie et al. |
| 2006/0187216 A1 | 8/2006 | Trent, Jr. et al. |
| 2006/0192690 A1 | 8/2006 | Philipp |
| 2006/0202969 A1 | 9/2006 | Hauck |
| 2006/0202970 A1 | 9/2006 | Lii et al. |
| 2006/0207806 A1 | 9/2006 | Philipp |
| 2006/0238513 A1 | 10/2006 | Philipp |
| 2006/0274047 A1 | 12/2006 | Spath et al. |
| 2006/0274055 A1 | 12/2006 | Reynolds et al. |
| 2006/0284836 A1 | 12/2006 | Philipp |
| 2007/0002192 A1 | 1/2007 | Nishino et al. |
| 2007/0008299 A1 | 1/2007 | Hristov |
| 2007/0026089 A1 | 2/2007 | Hu |
| 2007/0052690 A1 | 3/2007 | Roberts |
| 2007/0062739 A1 | 3/2007 | Philipp et al. |
| 2007/0074914 A1 | 4/2007 | Geaghan et al. |
| 2007/0085838 A1 | 4/2007 | Ricks et al. |
| 2007/0091076 A1 | 4/2007 | Schulz |
| 2007/0103446 A1 | 5/2007 | Chien et al. |
| 2007/0109274 A1 | 5/2007 | Reynolds |
| 2007/0159561 A1 | 7/2007 | Chien |
| 2007/0176906 A1 | 8/2007 | Warren |
| 2007/0222766 A1 | 9/2007 | Bolender |
| 2007/0229466 A1 | 10/2007 | Peng et al. |
| 2007/0229468 A1 | 10/2007 | Peng et al. |
| 2007/0229470 A1 | 10/2007 | Snyder et al. |
| 2007/0236475 A1 | 10/2007 | Wherry |
| 2007/0236478 A1 | 10/2007 | Geaghan et al. |
| 2007/0236618 A1 | 10/2007 | Maag et al. |
| 2007/0247443 A1 | 10/2007 | Philipp |
| 2007/0257893 A1 | 11/2007 | Philipp et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0264844 A1 | 11/2007 | Hu |
| 2007/0268265 A1 | 11/2007 | XiaoPing |
| 2007/0268266 A1 | 11/2007 | XiaoPing |

| | | |
|---|---|---|
| 2007/0268276 A1 | 11/2007 | Kent et al. |
| 2007/0273560 A1 | 11/2007 | Hua et al. |
| 2007/0273561 A1 | 11/2007 | Philipp |
| 2007/0279395 A1 | 12/2007 | Philipp et al. |
| 2007/0291009 A1 | 12/2007 | Wright et al. |
| 2007/0291016 A1 | 12/2007 | Philipp |
| 2007/0296709 A1 | 12/2007 | GuangHai |
| 2008/0001925 A1 | 1/2008 | XiaoPing |
| 2008/0007434 A1 | 1/2008 | Hristov |
| 2008/0007534 A1 | 1/2008 | Peng et al. |
| 2008/0012832 A1 | 1/2008 | GuangHai |
| 2008/0018618 A1 | 1/2008 | Hill et al. |
| 2008/0024461 A1 | 1/2008 | Richter et al. |
| 2008/0029292 A1 | 2/2008 | Takayama et al. |
| 2008/0041641 A1 | 2/2008 | Geaghan et al. |
| 2008/0042994 A1 | 2/2008 | Gillespie et al. |
| 2008/0048978 A1 | 2/2008 | Trent, Jr. et al. |
| 2008/0048997 A1 | 2/2008 | Gillespie et al. |
| 2008/0062139 A1 | 3/2008 | Hotelling et al. |
| 2008/0074398 A1 | 3/2008 | Wright |
| 2008/0111714 A1 | 5/2008 | Kremin |
| 2008/0122802 A1 | 5/2008 | Furuhashi et al. |
| 2008/0138589 A1 | 6/2008 | Wakabayashi et al. |
| 2008/0142352 A1 | 6/2008 | Wright |
| 2008/0143683 A1 | 6/2008 | Hotelling |
| 2008/0150905 A1 | 6/2008 | Grivna et al. |
| 2008/0150906 A1 | 6/2008 | Grivna |
| 2008/0158181 A1 | 7/2008 | Hamblin et al. |
| 2008/0158183 A1 | 7/2008 | Hotelling et al. |
| 2008/0165139 A1 | 7/2008 | Hotelling et al. |
| 2008/0165158 A1 | 7/2008 | Hotelling et al. |
| 2008/0264699 A1 | 10/2008 | Chang et al. |
| 2008/0309635 A1 | 12/2008 | Matsuo |
| 2009/0085891 A1 | 4/2009 | Yang et al. |
| 2009/0160824 A1 | 6/2009 | Chih-Yung et al. |
| 2009/0167710 A1 | 7/2009 | Jiang et al. |
| 2009/0194344 A1 | 8/2009 | Harley et al. |
| 2009/0236151 A1 | 9/2009 | Yeh et al. |
| 2009/0309850 A1 | 12/2009 | Yang |
| 2010/0045625 A1 | 2/2010 | Yang et al. |
| 2010/0066700 A1 | 3/2010 | Mozdzyn |
| 2010/0073319 A1 | 3/2010 | Lyon et al. |
| 2010/0271330 A1 | 10/2010 | Philipp |
| 2011/0157085 A1 | 6/2011 | Philipp |

FOREIGN PATENT DOCUMENTS

| | | |
|---|---|---|
| JP | 2004280720 A | 10/2004 |
| KR | 200229845 Y1 | 7/2001 |
| KR | 10-2005-0100274 A | 10/2005 |
| KR | 10-2007-0081902 A | 8/2007 |
| KR | 100907512 B1 | 7/2009 |

OTHER PUBLICATIONS

Adler, R., et al., An Economical Touch Panel using SAW Absorption, IEEE Transactions on Ultrasonics, Ferroelectrics and Frequency Control, Mar. 1987, vol. 34, No. 2, pp. 195-201.

HEATER FOR LIQUID CRYSTAL DISPLAY

BACKGROUND

A liquid crystal display (LCD) is a device that uses the light modulating properties of liquid crystals (LCs) to selectively filter incoming light to produce black and white or color images. An LCD is generally made up of a layer of LC molecules aligned between two transparent electrode layers (indium tin oxide (ITO)), two glass substrates and two polarizing filters (front and back polarizers, sometimes including retardation films), where the axes of light transmission of the polarizers are arranged perpendicular to each other (e.g., in the case of a "twisted-nematic" LCD). The surface of each of the electrode layers that is in contact with the LC molecules is treated (e.g., with a thin polymer layer that is unidirectionally rubbed, also known as an alignment layer) so as to align the LC molecules in a particular direction in the absence of an applied voltage. The direction of the LC alignment is then defined by the direction of rubbing.

There are many types of LCDs, using different types of LC materials and different orientations. The LC molecules are often oriented or aligned in a helical or "twisted" direction in the absence of an applied voltage. In the "active driving" context, LCDs are typically twisted-nematic LCDs (e.g., TN type TFT LCDs) in which the twisted angle between the LC molecules in contact with the alignment layers is 90 degrees. In the "passive multiplex driving" context, LCDs are either twisted-nematic LCDs for use in passive low multiplex driving situations (e.g., less than about 16 multiplexes) or "super twisted-nematic" LCDs (e.g., STN LCDs) for use in high multiplex driving situations (e.g., greater than or equal to about 16 multiplexes). For STN LCDs, the twisted angle is generally greater than or equal to 180 degrees, and the first polarizing axis may not necessarily be perpendicular to the second polarizing axis.

In any case, a reflective surface or, less commonly, a backlight, is arranged behind the back polarizer. Images are produced by the LCD when light is transmitted from the backlight through both of the back and front polarizers. As the light passes through the LC material it can be selectively rotated in a polarization orientation (or not rotated) so that the light is selectively blocked by (or passes through) the front polarizer. Further, the LCD is typically divided into separate portions, known as picture elements (or pixels). To turn off a pixel of an LCD (which can be thought of as a shutter) so as to prevent the transmission of light through the front polarizer, a voltage is applied across the LC material of the pixel which changes the orientation of the LC molecules making up the pixel (shutter) by causing the LC molecules to align themselves with the electric field instead of being aligned in a helical orientation. Depending on the orientation of the LC molecules, the polarized light passing therethrough is either passed without changing the polarization orientation of the light, or the polarization orientation is rotated 90 degrees. In one type of display, each pixel can be paired with a colored filter (to form a single sub-pixel) to remove all but the red, green or blue (RGB) portion of the light from the original white light source. The sub-pixels are so small that when the display is viewed from even a short distance, the individual colors blend together to produce a single spot of color, a pixel. The shade of color is controlled by changing the relative intensity of the light passing through the sub-pixels.

Figure 1:
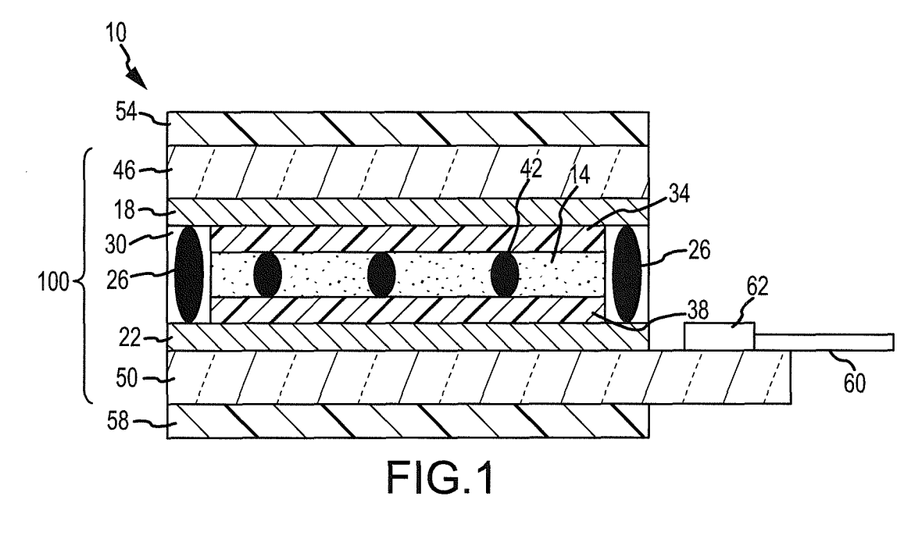
FIG. 1 is a sectional view of an LCD device according to the prior art.

FIG. 1 illustrates one type of LCD device 10 including an LC material 14 that is operable to selectively allow light to pass through the device 10. The device 10 includes first (e.g., front) and second (e.g., rear) ITO layers 18, 22 (each of which includes a plurality of electrodes) that are spaced apart by conductive spacers 26 and sealed adjacent their outer perimeters by any appropriate seal frit 30 (e.g., seal glue). The conductive spacers 26 are electrically interconnected to conductive traces (not shown) of both of the first and second ITO layers 18, 22. Although at least the majority of the seal frit 30 may be allowed to harden in any appropriate manner (e.g., drying, curing), an aperture (not shown) may be formed or left in the seal frit 30 to allow for the introduction of the LC material 14 into the space between the first and second ITO layers 18, 22. First and second polyimide alignment layers 34, 38 having first and second respectively grooved surfaces (not labeled) are respectively disposed on inside surfaces of the first and second ITO layers 18, 22 so as to align the molecules of the LC material 14 in the direction of the grooved surfaces in the absence of an applied electric field. One or more additional spacers 42 may be included to space apart the first and second polyimide layers 34, 38. First (e.g., front) and second (e.g., rear) transparent plates 46, 50 (e.g., glass or plastic plates) are arranged parallel to each other and disposed on outside surfaces of the first and second ITO layers 18, 22. With reference to FIG. 1, the portion of the device 10 spanning from the first transparent plate 46 towards and including the second transparent plate 50 may be considered an "LCD cell" 100.

The device 10 also includes first (e.g., front) and second (e.g., rear) polarizers 54, 58 (e.g., linear polarizers with retardation films) arranged parallel to each other and disposed on outside surfaces of the first and second transparent plates 46, 50 of the LCD cell 100. For instance, the polarization axes of the first and second polarizers 54, 58 may typically be aligned orthogonally with respect to each other. The device 10 also includes at least one conductive connector 60 (e.g., flexible printed circuit (FPC) connector) and a driver 62 that may be electrically interconnected to the device 10 at any appropriate location (e.g., as shown, to the second transparent plate 50) for applying a voltage to the LC molecules of various pixels or sub-pixels of the device 10 (via the electrodes of the first and second ITO layers 18, 22) to position the LC molecules in a particular orientation. More specifically, the driver 62 serves to flow a current through conductive traces of the second ITO layer 22 which current passes through the conductive spacers 26 to the conductive traces of the first ITO layer 18. While not shown, the driver 62 may be directly electrically interconnected to the conductive traces of the second ITO layer 22 or else directly electrically interconnected to one or more intermediate conductive traces or wires that are directly electrically interconnected to the conductive traces of the second ITO layer 22. Additionally, the device 10 includes any appropriate backlight (not shown) that operates to transmit light through the second polarizer 58 towards the first polarizer 54.

The polarizers 54, 58 serve to filter the transmitted light so that the light passes therethrough in only one plane or orientation of polarization. Thus, light beams are transmitted or blocked depending upon the position of the polarizers 54, 58 with respect to one another and the voltage applied via the electrodes of the ITO layers 18, 22 to the LC material 14, with the result that a corresponding driven pixel of the display appears dark or bright (and a non-driven pixel is the opposite). In this regard, images may be displayed on the device 10 by selectively controlling the brightness of each pixel.

One primary weakness of the device 10 is the low response time of the LC material 14 at low temperatures. At temperatures below −30° C., for instance, the device 10 can cease refreshing of the display. Also at such temperatures, the display contrast and viewing angle can drop to unacceptable levels. The main reason for these drawbacks is the increased viscosity of the LC material 14 at such low environment temperature which limits the orienting effect that an applied voltage would otherwise have on the molecules of the LC material 14. Additionally, the birefringence of the LC material 14 (i.e., the decomposition of a light ray into two rays when it passes through the LC material 14) in combination with cell gap thickness also will be changed at such low operating temperatures, which impacts display transmittance, contrast and viewing angle.

Figure 2A:
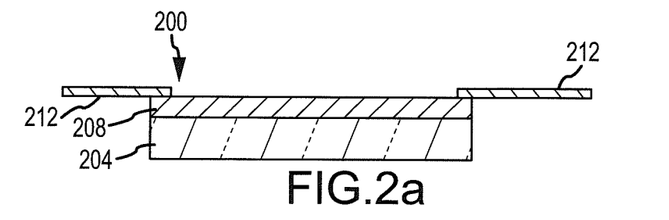
FIG. 2a is a side sectional view of a glass ITO heater usable with the LCD device of FIG. 1, according to the prior art.
Figure 2B:
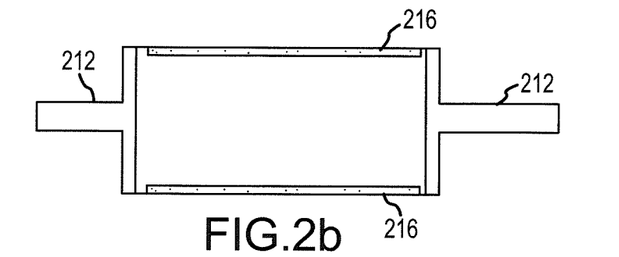

A popular method for remedying the above disadvantages is attaching a glass ITO heater under the device 10 to heat the LC material 14 when the LC material 14 is working at low environmental temperatures. Turning to FIGS. 2a-2b, a standard structure of a glass ITO heater 200 is illustrated. The heater 200 includes a glass plate 204, an ITO layer 208 disposed over one surface of the plate 204, and a pair of connectors 212 (e.g., FPC connectors) electrically connected to electrodes of the ITO layer 208 at opposing ends of the ITO layer 208. By applying a voltage across the ITO layer 208 and passing a current therethrough, the heater 200 generates heat by resistive heating of the ITO layer 208. With additional reference now to FIG. 3, a device or assembly 300 is formed by attaching the heater 200 to the LCD device 10. Specifically, the ITO layer 208 of the heater 200 is interconnected to the second polarizer 58 of the device 10 via a pair of pieces or strips of doubled-sided tape 216. In the interest of clarity, the LC cell 100 has been largely represented in FIG. 3 as a schematic box (with only the first and second glass plates 46, 50 being shown) and the connectors 212 of the glass ITO heater 200 have been removed.

Figure 3:
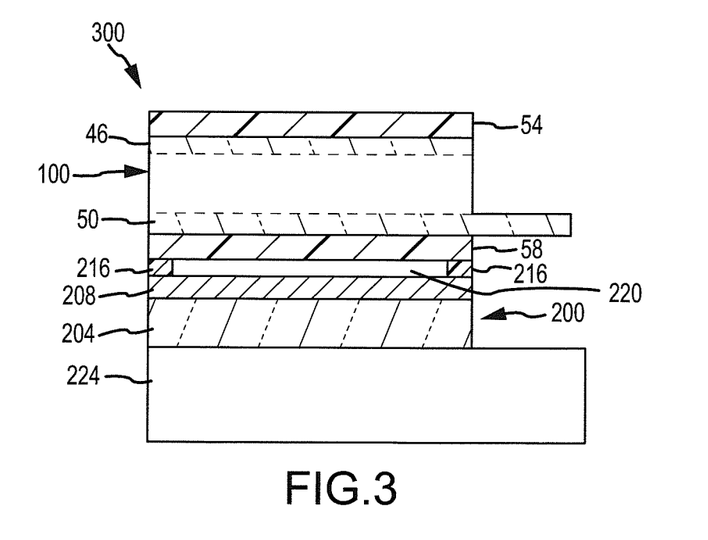

As shown, an air gap 220 naturally exists between the ITO layer 208 of the heater 200 and the second polarizer 58 due to the use of the double-sided tape 216. A backlight 224 is provided to transmit light through the glass plate 204 of the heater 200, the second polarizer 58, etc. so as to produce an appropriate image with the device 10. Any appropriate controller or driver may pass an applied voltage via the connector 212 to the electrodes of the ITO layer 208 to produce heat that is transmitted towards and through the second polarizer 58, the second transparent plate 50, the second ITO layer 22 and the second polyimide layer 38, and eventually to the LC material 14 to reduce the viscosity thereof.

The inventor has determined that utilizing a glass ITO heater to heat LC material in the manner discussed above includes a number of shortcomings that limit the ability of the heater to effectively reduce the viscosity of the LC material and/or limit the performance of the assembly 300. In one regard, the air gap 220 between the heater 200 and the device 10 causes light reflection and corresponding light transmission loss as light transmitted from the backlight 224 passes into the air gap 220 towards the second polarizer 58. Furthermore, the thickness of the air gap 220 is often uneven which increases the likelihood of "Mura" defects (i.e., irregular luminosity variation defects) in resulting images. Still further, light rays traveling from the backlight 224 can experience low-levels of birefringence as they travel through the glass plate 204.

In addition to the adverse effects on light transmission, the above manner of heating the LC material 14 is inefficient as the generated heat must travel through a number of layers (e.g., the second polarizer 58, the second transparent plate 50, etc.) before eventually reaching the LC material 14. Furthermore, the glass plate 104 of the heater 100 is unnecessarily thick and susceptible to breakage, and the resistance of the ITO layer 108 may be affected over time due to oxidation and exposure to air (e.g., via the air gap 120).

SUMMARY

The following embodiments and aspects of thereof are described and illustrated in conjunction with components, assemblies, and methods which are meant to be exemplary and illustrative rather than limiting in scope. In various embodiments, one or more of the above-described problems have been reduced or eliminated, while other embodiments are directed to other improvements.

Disclosed herein is a device including an LCD cell and a heater. The LCD cell includes first and second transparent plates arranged parallel to each other. Each of the first and second transparent plates includes opposed inner and outer surfaces and the inner surfaces of the first and second transparent plates face each other. The LCD cell also includes first and second transparent conductive layers respectively formed on the inner surfaces of the first and second transparent plates; and a liquid crystal material sealed between the first and second transparent conductive layers. The heater includes a transparent substrate having opposed first and second surfaces and a third transparent conductive layer formed on the first surface of the substrate. The third transparent conductive layer is adapted to generate heat upon flowing a current therethrough, and the heater is disposed against the outer surface of the second transparent plate of the LCD cell so that the device is free of air gaps between the second transparent layer and the third transparent conductive layer.

The device may include a first polarizer including a polarizing axis disposed over the outer surface of the first transparent plate and a second polarizer including a polarizing axis disposed over the second surface of the substrate, where the polarizing axes of the two polarizers are different. The device may include an optically clear adhesive (OCA) disposed between the second transparent layer and the third transparent conductive layer to secure the third transparent conductive layer to the outer surface of the second transparent plate. The transparent substrate may include a film such as a cellulose triacetate (TAC) or a cyclic olefin polymer (COP).

First and second conductive bus bars (e.g., silver or the like) may be formed on opposing sides of the third transparent conductive layer. A single connector may be electrically interconnected to the first and second bus bars and electrically interconnectable to a controller for facilitating generation of heat by the third transparent conductive layer. A backlight may be interconnected to the second polarizer and be adapted to transmit light rays through the second polarizer.

Also disclosed herein is a heater for a LCD and including a transparent film, a transparent conductive layer formed on a surface of the transparent film, and first and second spaced bus bars disposed over a surface of the transparent conductive layer, where the transparent conductive layer is adapted to generate heat upon flowing a current therethrough via the first and second bus bars.

The heater may include an OCA disposed over the transparent conductive layer and the first and second bus bars. A single connector may be electrically interconnected to the first and second bus bars and electrically interconnectable to a controller for facilitating generation of heat by the transparent conductive layer via the first and second bus bars. Each of the first and second bus bars may include first and second ends respectively extending between first and second ends of the transparent conductive layer, where the single connector is electrically interconnected to the first ends of the first and second bus bars.

Also disclosed herein is a method of creating a heater including applying a transparent conductive layer to a surface of a transparent film, and applying at least first and second conductive bus bars to the transparent film surface over the transparent conductive layer, where each of the first and second conductive bus bars extends from a first end of the transparent conductive layer to a second end of the transparent conductive layer. The method also includes laminating an OCA layer over the transparent conductive layer and the first and second conductive bus bars.

A single FPC connector may be bonded to the first and second conductive bus bars adjacent one of the first and second ends of the transparent conductive layer. The method may also include providing an LC cell that includes front and rear transparent plates arranged parallel to each other, front and rear transparent conductive layers respectively formed on inner surfaces of the front and rear transparent plates, and a liquid crystal material sealed between the front and rear transparent conductive layers; laminating the heater directly to the rear transparent plate of the LC cell using the OCA; laminating a front polarizer having a first axis of light transmission to the front transparent plate of the LC cell; and laminating a rear polarizer having a second axis of light transmission to the transparent film of the heater, where the first axis of transmission is different than the second axis of transmission. A backlight may be secured to the rear polarizer.

Also disclosed herein is a method including providing a heater having a transparent film, a transparent conductive layer formed on a surface of the transparent film, first and second spaced bus bars disposed over the transparent film, and an OCA disposed over the transparent conductive layer and the first and second bus bars; providing a LC cell that includes front and rear transparent plates arranged parallel to each other, front and rear transparent conductive layers respectively formed on inner surfaces of the front and rear transparent plates, and a liquid crystal material sealed between the front and rear transparent conductive layers; and laminating the heater directly to the rear transparent plate of the LC cell using the OCA. The method may include laminating a front polarizer having a first polarizing axis to the front transparent plate of the LC cell, and laminating a rear polarizer having a second polarizing axis to the transparent film of the heater, where the first polarizing axis is perpendicular to the second polarizing axis.

In addition to the exemplary aspects and embodiments described above, further aspects and embodiments will become apparent by reference to the drawings and by study of the following descriptions.

BRIEF DESCRIPTION OF THE DRAWINGS

FIG. 2b is a top view of the glass ITO heater of FIG. 2a.

FIG. 3 is a side sectional view of an assembly including the LCD device of FIG. 1 and the glass ITO heater of FIG. 2a.

FIG. 5b is a top view of the heater of FIG. 5a.

DETAILED DESCRIPTION

Reference will now be made to the accompanying drawings, which assist in illustrating the various pertinent features of the embodiments presented herein. Although described primarily in conjunction with an LCD display, it should be expressly understood that the heater disclosed herein may be applicable to other types of electronic displays such as plasma displays, electroluminescent displays, and the like. In this regard, the following description is presented for purposes of illustration and description. Furthermore, the description is not intended to limit the disclosed embodiments to the form disclosed herein. Consequently, variations and modifications commensurate with the following teachings, and skill and knowledge of the relevant art, are within the scope of the present application.

Figure 4:
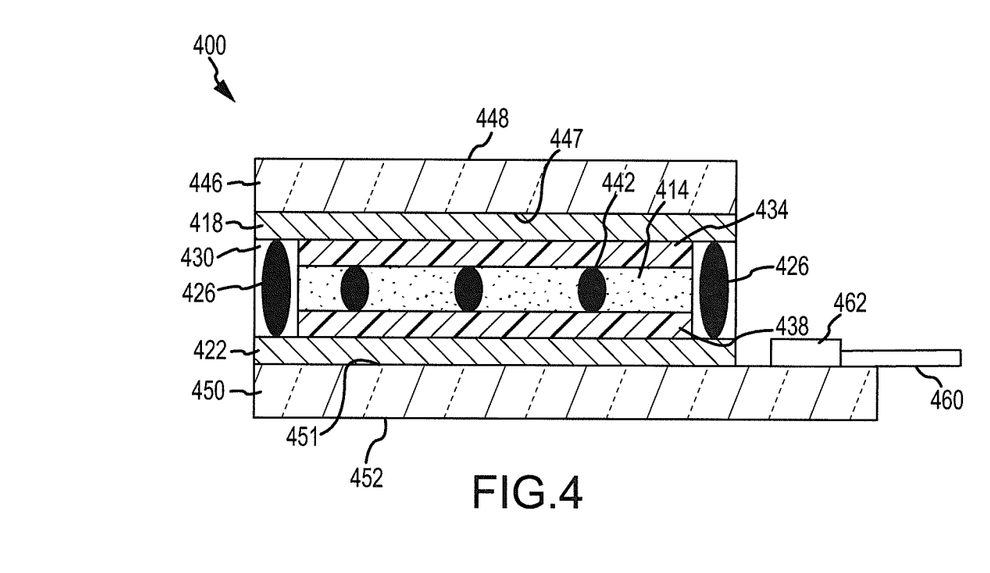
FIG. 4 is a side sectional view of an LC cell according to one embodiment.

Turning now to FIG. 4, an LC cell 400 includes an LC material 414 (which may be divided into a number of pixels and/or sub-pixels) that is operable to selectively allow light to pass through the LC cell 400 (e.g., from any appropriate backlight) based upon a particular voltage level applied to various pixels or sub-pixels of the LC material 414. The LC cell 400 includes first (e.g., front) and second (e.g., rear) transparent conductive (e.g., ITO) layers 418, 422. Each of the transparent conductive layers 418, 422 includes a plurality of any appropriate arrangement and shape of electrodes (e.g., such as a plurality of rows and columns of strip electrodes, not shown), where electrodes of one of the layers 418, 422 are common electrodes and the electrodes of the other of the layers 418, 422 are segment electrodes. While not shown, each of the transparent conductive layers 418, 422 includes a plurality of conductive output traces electrically interconnected to the respective plurality of electrodes. Conductive spacers 416 may be electrically interconnected between the conductive traces of the transparent conductive layers 418, 422 and may serve to space apart the transparent conductive layers 418, 422. A seal frit 430 may be used to seal a space between the first and second transparent conductive layers 418, 422 to contain the LC material 414. While at least the majority of the seal frit 430 may be allowed to harden in any appropriate manner (e.g., drying, curing), an aperture (not shown) may be formed or left in the seal frit 430 to allow for the introduction of the LC material 414 into the space between the first and second transparent conductive layers 418, 422 which may be subsequently sealed or otherwise closed.

Any appropriate alignment layers such as first and second polyimide layers 434, 438 having first and second respectively grooved surfaces (not shown) may be respectively disposed on inside surfaces of the first and second transparent conductive layers 418, 422 so as to align the molecules of the LC material 414 in the direction of the grooved surfaces in the absence of an applied electric field. One or more additional spacers 442 may be included to space apart the first and second polyimide layers 434, 438. The LC cell 400 also may include parallel first (e.g., front) and second (e.g., rear) transparent plates 446, 450 (e.g., glass or plastic plates) having respective inner surfaces 447, 451 and outer surfaces 448, 452. For instance, the first and second transparent conductive layers 418, 422 may be appropriately formed (e.g., via screen printing, etching, etc.) on the inner surfaces 447, 451 of the first and second transparent plates 446, 450.

The LC cell 400 may also include at least one connector 460 (e.g., FPC connector) and at least one driver 462 that may be electrically interconnected to the LC cell 400 at any appropriate location (e.g., as shown, to the second transparent plate 450) for applying a voltage to the LC molecules of various pixels or sub-pixels of the LC cell 400 (via the electrodes of the first and second ITO layers 418, 422) so as to position the LC molecules in a particular orientation. More specifically, the driver 462 serves to flow a current through conductive traces of the second ITO layer 422 which current passes through the conductive spacers 426 to the conductive traces of the first ITO layer 418. While not shown, the driver 462 may be directly electrically interconnected to the conductive traces of the second ITO layer 422 or else directly electrically interconnected to one or more intermediate conductive traces or wires that are directly electrically interconnected to the conductive traces of the second ITO layer 422. It is noted that the LC cell 400 of FIG. 4 (as well as other components disclosed herein) is not drawn to scale. For example, the size of the spacers 426, 442 relative to the volume of LC material 414 is greatly exaggerated. Further, in order to apply a voltage across the LC material 414, a voltage difference must be created between the two transparent conductive layers 418, 422.

As discussed previously, current technologies for heating an LCD device (e.g., as in FIGS. 2a-3) typically involve mounting a glass ITO heater onto a rear polarizer of the LCD device. However, such arrangements result in an air gap between the glass ITO heater and the LCD device which causes light reflection, corresponding light transmission loss, and Mura defects as light passes into the air gap (e.g., from a backlight) towards the rear polarizer. Additionally, these arrangements result in low heating efficiency as the heat generated by the ITO layer of the glass ITO heater must travel through a number of layers (e.g., the rear polarizer, the rear glass plate, etc.) before reaching the LC material.

Figure 5A:
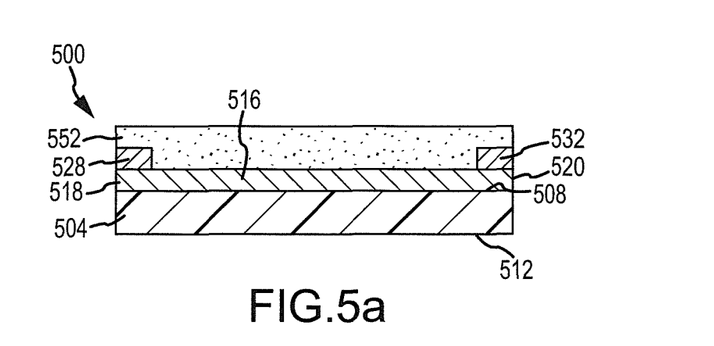
FIG. 5a is a side sectional view of a heater according to one embodiment.
Figure 5B:
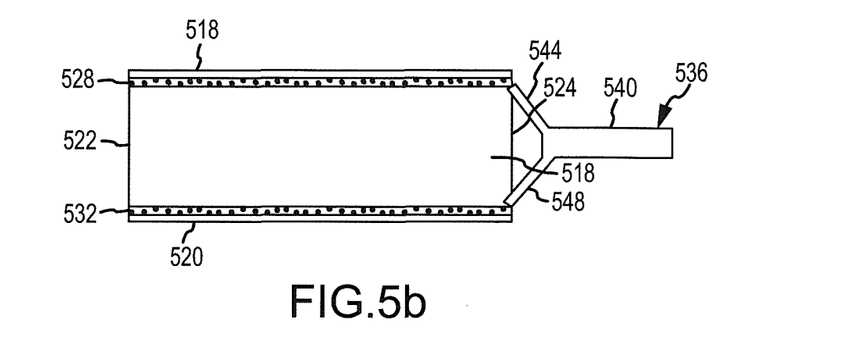

Turning now to FIG. 5a-5b, a heater 500 according to one embodiment is illustrated that may be utilized to overcome or alleviate at least some of the above-discussed drawbacks of current display heating technologies. The heater 500 includes a substrate 504 having opposed first and second surfaces 508, 512. In one arrangement, the substrate 504 may be a transparent film having high levels of light transmittance and low levels of birefringence. For instance, the substrate 504 may be a film or layer of cellulose triacetate (TAC). As another example, the substrate may be a film or layer of a cyclic olefin polymer (COP), such as ZeonorFilm®, produced by OPTES, Inc. of Tokyo, Japan.

A transparent conductive layer (e.g., ITO) 516 having first and second opposed sides 518, 520 and first and second opposed ends 522, 524 may be appropriately formed (e.g., via spattering) on the first surface 508. First and second conductive bus bars 528, 532 of any appropriate conductive material (e.g., silver) may be respectively formed (e.g., via screen printing) over the transparent conductive layer 516 generally adjacent the first and second sides 518, 520 and generally between the first and second ends 522, 524A single conductive connector 536 (e.g., an FPC connector) disposed adjacent one of the first and second ends 522, 524 of the transparent conductive layer 516 and electrically interconnected to both of the first and second bus bars 528, 532 may be used to facilitate the electrical interconnection of the transparent conductive layer 516 to any appropriate driver, controller, and/or the like (e.g., the same controller to which the connector 460 is electrically connected).

Stated differently, instead of utilizing first and second connectors that are electrically interconnected to first and second spaced ends of a transparent conductive layer (e.g., as in FIG. 2a), the heater 500 may in some embodiments utilize only the single connector 536 which advantageously simplifies the design of the heater 500. For instance, the connector 536 may include a base 540 in addition to first and second legs 544, 548 (e.g., conductive wires, strips, etc.) electrically interconnected to the base 540 and adapted to be respectively electrically interconnected to the first and second bus bars 528, 532 in any appropriate manner. The base 540 may be appropriately electrically interconnected to a driver, controller, and/or the like which serves to apply a voltage to the transparent conductive layer 516 which causes the generation of heat.

As shown in FIG. 5a, the heater 500 may also include any appropriate transparent bonding agent or tape such as an optically clear adhesive (OCA) 552 disposed over the transparent conductive layer 516 and the first and second bus bars 528, 532 (the OCA 552 being removed from FIG. 5b in the interest of clarity). More specifically, the OCA 552 may be disposed over substantially an entire length and width of the heater 500 to allow the heater 500 to be appropriately secured (e.g., via lamination of the OCA 552) to the LC cell 400 in a manner that is substantially free of air gaps (e.g., such as the air gap 220 in FIG. 3).

Figure 7:
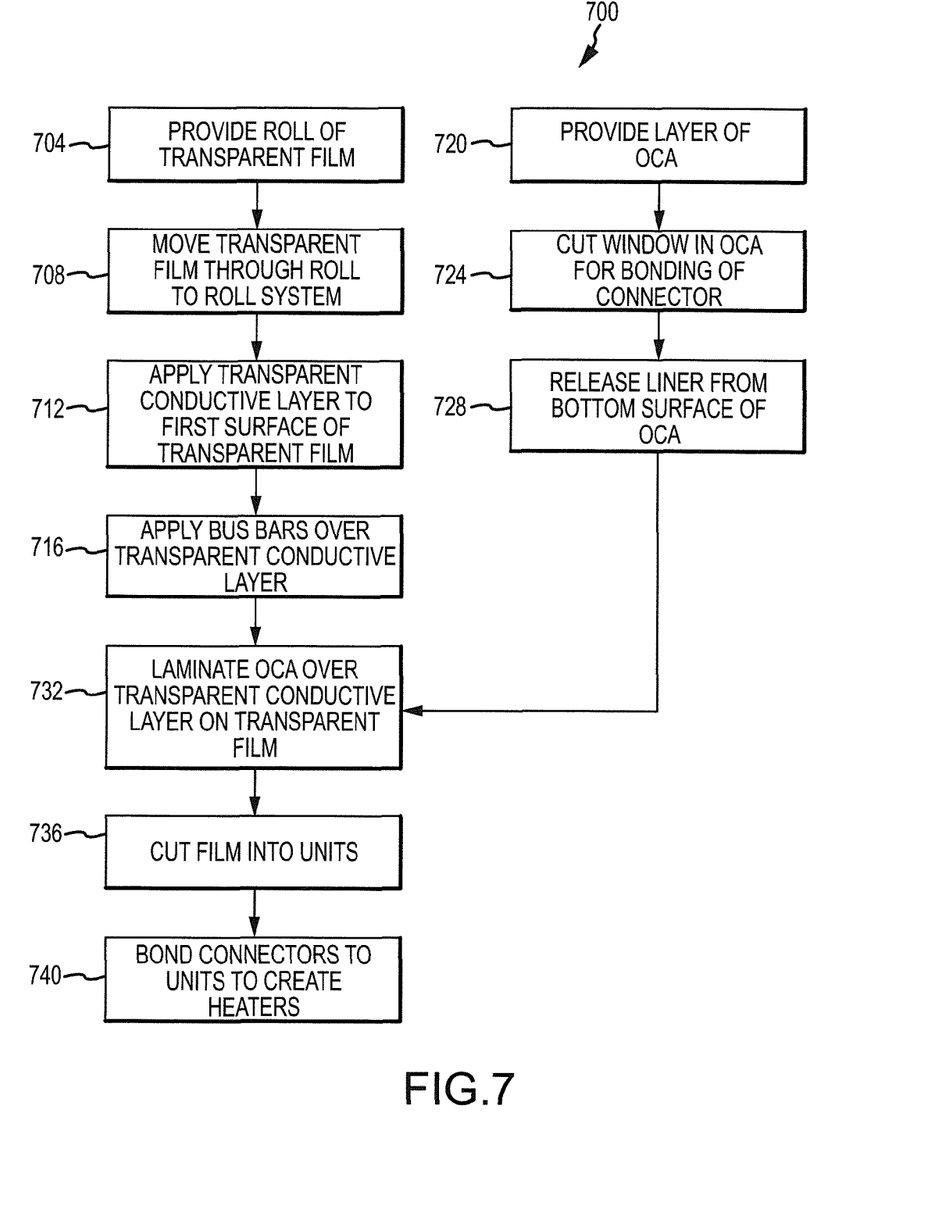
FIG. 7 is a flow diagram illustrating a method that may be used to manufacture the heater of FIGS. 5a-5b.

FIG. 7 is a flow diagram illustrating a method 700 of manufacturing the heater 500 of FIGS. 5a-5b. While the method 700 will be discussed in the context of a roll-to-roll system, it is envisioned that other manners of manufacturing the heater 500 may be used. At 704, a roll of any appropriate transparent film may be provided such as a roll of TAC film, a roll of COP film, or the like. The roll may then be mounted onto or otherwise secured to a supply reel of a roll-to-roll system (e.g., a tape or film transport system) made up of a number of rollers for guiding the transparent film through various operational stations, a take-up reel for receiving transparent film that has traveled through the operational stations, and one or more drive motors for inducing movement of the transparent film in first and/or second opposite longitudinal directions. Furthermore, the roll-to-roll system may include or be associated with any appropriate computing system including a processing unit (e.g., CPU), memory unit (e.g., RAM), any appropriate I/O devices (e.g., keyboard, mouse, display, and the like), and one or more programs including protocols or logic storable in the memory unit and executable by the processing unit for controlling operation of the roll-to-roll system.

Once the transparent film has started moving 708 through the system, a transparent conductive layer (e.g., a solid ITO layer such as transparent conductive layer 516 in FIG. 5a) may be applied 712 (e.g., via low temperature spattering or the like) at one operational station to a first surface (e.g., first surface 508) of the transparent film at one of the operational stations and a plurality of bus bars (e.g., first and second bus bars 528, 532) may be applied (e.g., via printing or the like) at another operational station to the first surface of the transparent film over the transparent conductive layer. As shown at 720, a roll of OCA (e.g., OCA tape) may be provided and mounted to a reel for movement through the roll-to-roll system. Either before or after the OCA is mounted within the system, any appropriate window or opening may be cut or otherwise formed into a portion of the OCA for subsequent bonding of a connector (e.g., FPC) to the bus bars via the window through the OCA. With reference to FIG. 5b, it can be seen how the first and second legs 544, 548 of the connector 536 are respectively electrically connected (e.g. via welding, conductive adhesive, or the like) to the first and second bus bars 544, 548. While the OCA 552 has been removed for clarity from FIG. 5a, it can be appreciated how cutting windows or openings into a side portion of the OCA 552 adjacent the ends of the first and second bus bars 544, 548 facilitates electrical interconnection between the connector 536 and the bus bars 544, 548.

Turning back to FIG. 7, a liner may be released 728 (e.g., as part of the roll-to-roll process) from one surface (e.g., bottom surface) of the OCA and then the exposed OCA surface may be laminated 732 at another operational station to the transparent film over the transparent conductive layer. After the OCA has been laminated 732 to the transparent film, the film may be cut 736 into appropriately sized units (e.g., sized for any appropriate display(s)) and connectors (e.g., FPC connectors such as connector 536) may be electrically interconnected to the bus bars to create a heater. See heater 500 of FIGS. 5a-5b.

Figure 6:
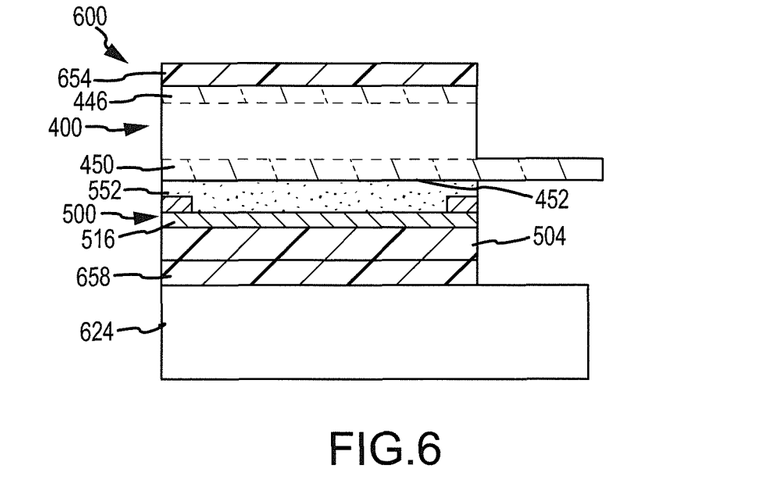
FIG. 6 is an LCD assembly including the LC cell of FIG. 4 and the heater of FIGS. 5a-5b, according to one embodiment.
Figure 8:
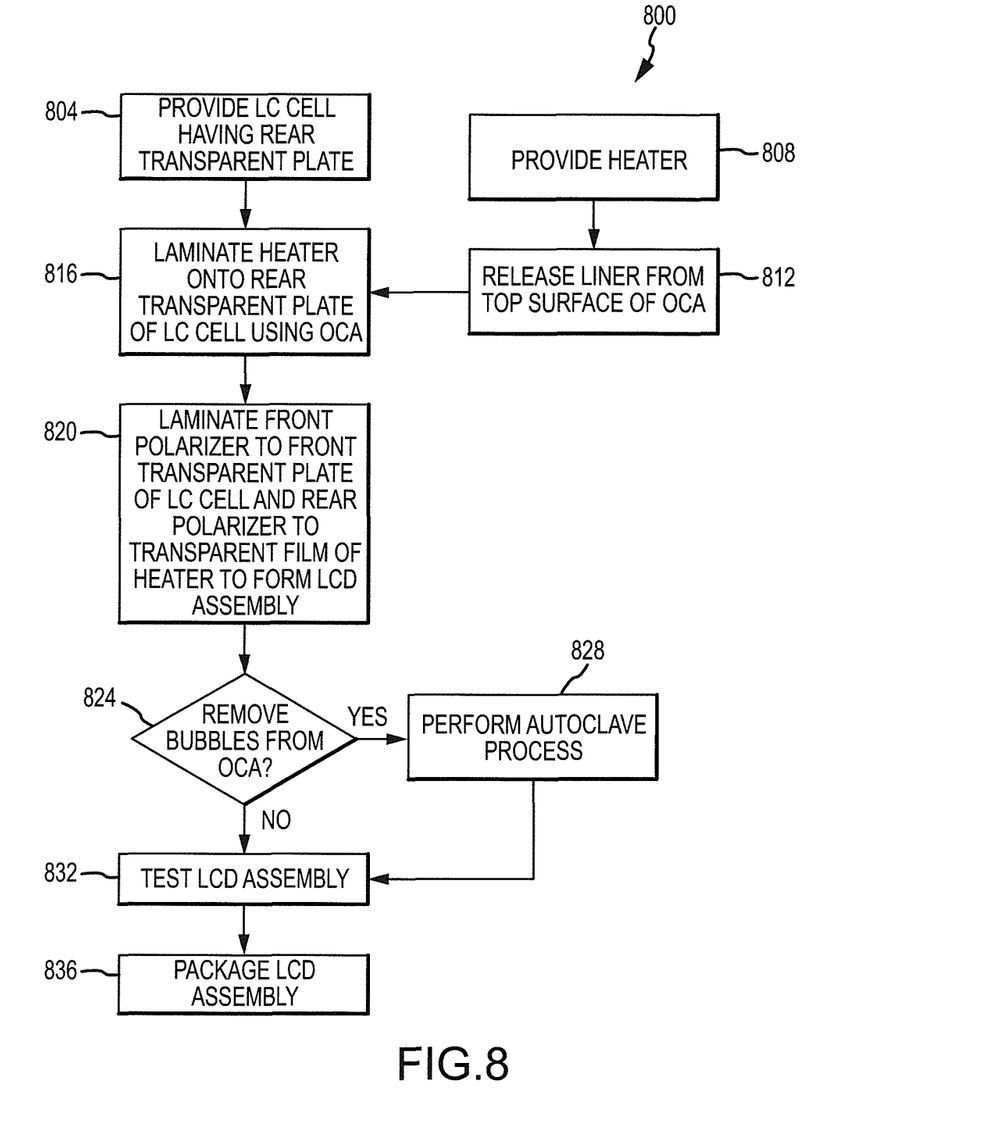
FIG. 8 is a flow diagram illustrating a method that may be used to manufacture the LCD assembly of FIG. 6.

FIG. 8 is a flow diagram illustrating a method 800 of manufacturing an LCD assembly, such as the LCD assembly 600 of FIG. 6. At 804 and 808, an LC cell (e.g., LC cell 400 of FIG. 4) having a rear transparent plate (e.g., second/rear transparent plate 450) and a heater (e.g., heater 500 of FIGS. 5a-5b) may be respectively provided. In the event the OCA of the heater has a top release liner, the release liner may be removed 812 to expose the top surface of the OCA. In any case, the top surface of the OCA of the heater may be disposed against or at least adjacent the rear transparent plate of LC cell and then the heater may be laminated 816 to the rear transparent plate of the LC cell. With reference to the LCD assembly 600 of FIG. 6, the OCA 552 of the heater 500 is disposed against the second/rear transparent plate 450 of the LC cell 400. In the interest of clarity, the LC cell 400 has been largely represented in FIG. 6 as a schematic box (with only the first and second transparent plates 446, 450 being shown) and the connector 536 of the heater 500 has been removed.

Turning back to FIG. 8, the method 800 may include laminating 820 a front polarizer (e.g., via a thin glue layer disposed on a bottom side of the front polarizer and exposed via removal of a release liner) to the first/front transparent plate of the LC cell and a rear polarizer to the second/bottom surface of the transparent film. For instance, the LCD assembly 600 of FIG. 6 illustrates a first (e.g., front) polarizer 654 being appropriately secured to the first transparent plate 446 and a second (e.g., rear) polarizer 658 being appropriately secured to the substrate 504 (e.g., transparent film) of the heater 500. The method 800 may also query 824 whether any bubbles or air gaps need to be removed from the OCA and/or any other portions of the LCD assembly. In response to an affirmative answer at 824, the method 800 may proceed to perform 828 any appropriate autoclave (i.e., high pressure) process to eliminate or at least reduce the likelihood of bubbles, air gaps, and the like within the various portions of the LCD assembly. In any event, the LCD assembly may also be tested 832 and packaged 836 in any appropriate manner. At any appropriate time, a backlight 624 may be appropriately secured to the second polarizer 658 for generating and transmitting light rays through the second polarizer and heater 500 towards the LC cell 400 and the first polarizer 654.

The heater 500 and assembly 600 disclosed herein present a number of advantages over current technologies for heating LC (or other) material of various types of displays. In one regard, use of a transparent film (e.g., TAC, COP, and/or the like) as the substrate of the heater 500 advantageously avoids or at least reduces birefringence of light rays passing through the substrate and the attendant reduction in image quality associated therewith. Furthermore, use of such transparent films allows for a great reduction in thickness of the heater 500 (e.g., down to about 0.15 mm) as compared to glass-based ITO heaters.

In another regard, use of an OCA to optically bond or laminate the heater 500 to the LC cell 400 advantageously eliminates or greatly reduces the occurrence of air gaps, bubbles and the like between and among the second/rear transparent plate 450 of the LC cell 400 and the heater 500. As a result, reflection and corresponding transmission loss of light as the light travels from the backlight 624 through the second/rear polarizer 658 and the heater 500 before traveling through the LC cell 400 can be reduced.

Furthermore, positioning of the heater 500 directly against the second/rear transparent plate 450 (rather than separating the heater 500 from the second/rear transparent plate 450 via a second/rear polarizer) advantageously increases the heating efficiency of the heater 500 because the generated heat need not additionally travel through the second/rear polarizer (i.e., the heater 500 is positioned closer to the LC material 414 of the LC cell 400). Still further, use of the first and second bus bars 528, 532 advantageously allows for use of only a single connector (e.g., connector 536) to electrically interconnect the transparent conductive layer 516 of the heater 500 to control electronics which simplifies the overall design of the heater 500.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:
1. A device, comprising:
  a liquid crystal display (LCD) cell that includes:
    first and second transparent plates arranged parallel to each other, wherein each of the first and second transparent plates includes opposed inner and outer surfaces, and wherein the inner surfaces of the first and second transparent plates face each other;
    first and second transparent conductive layers respectively formed on the inner surfaces of the first and second transparent plates; and
    a liquid crystal material sealed between the first and second transparent conductive layers; and
  a heater that includes:
    a transparent substrate having opposed first and second surfaces, wherein the transparent substrate comprises a film, and wherein the film comprises a cellulose triacetate (TAC) or a cyclic olefin polymer (COP); and
    a third transparent conductive layer formed on the first surface of the substrate, wherein the third transparent conductive layer is adapted to generate heat upon flowing a current therethrough, and wherein the heater is disposed against the outer surface of the second transparent plate of the LCD cell so that the device is free of air gaps between the second transparent layer and the third transparent conductive layer.
2. A device as set forth in claim 1, further including:
  a first polarizer, including a polarizing axis, disposed over the outer surface of the first transparent plate; and a second polarizer, including a polarizing axis, disposed over the second surface of the substrate, wherein the polarizing axes of the two polarizers are different.

3. A device as set forth in claim 1, further including:
an optically clear adhesive (OCA) disposed between the second transparent layer and the third transparent conductive layer, wherein the OCA secures the third transparent conductive layer to the outer surface of the second transparent plate.

4. A device as set forth in claim 1, further including:
first and second bus bars formed on opposing sides of the third transparent conductive layer.

5. A device as set forth in claim 4, wherein the first and second bus bars include first and second silver bars.

6. A device as set forth in claim 4, further including:
a single connector electrically interconnected to the first and second bus bars, wherein the single connector is electrically interconnectable to a controller for facilitating generation of heat by the third transparent conductive layer.

7. A device as set forth in claim 1, further including:
a backlight interconnected to the second polarizer and adapted to transmit light rays through the second polarizer.

8. A heater for a liquid crystal display (LCD), comprising:
a transparent film including one of a cellulose triacetate (TAC) or a cyclic olefin polymer (COP);
a transparent conductive layer formed on a surface of the transparent film; and
first and second spaced bus bars disposed over a surface of the transparent conductive layer, wherein the transparent conductive layer is adapted to generate heat upon flowing a current therethrough via the first and second bus bars.

9. A heater as set forth in claim 8, further including:
an optically clear adhesive (OCA) disposed over the transparent conductive layer and the first and second bus bars.

10. A heater as set forth in claim 9, further including:
a single connector electrically interconnected to the first and second bus bars, wherein the single connector is electrically interconnectable to a controller for facilitating generation of heat by the transparent conductive layer via the first and second bus bars.

11. A heater as set forth in claim 8, further including:
a single connector electrically interconnected to the first and second bus bars.

12. A heater as set forth in claim 11, wherein each of the first and second bus bars comprises first and second ends respectively extending between first and second ends of the transparent conductive layer, and wherein the single connector is electrically interconnected to the first ends of the first and second bus bars.

13. A method of creating a heater, comprising:
applying a transparent conductive layer to a surface of a transparent film, wherein the transparent film includes one of a cellulose triacetate (TAC) or a cyclic olefin polymer (COP);
applying at least first and second conductive bus bars to the transparent film surface over the transparent conductive layer, wherein each of the first and second conductive bus bars extends from a first end of the transparent conductive layer to a second end of the transparent conductive layer; and laminating an optically clear adhesive (OCA) layer over the transparent conductive layer and the first and second conductive bus bars.

14. A method as set forth in claim 13, further including:
bonding a single flexible printed circuit (FPC) connector to the first and second conductive bus bars adjacent one of the first and second ends of the transparent conductive layer.

15. A method of creating a heater, comprising:
applying a transparent conductive layer to a surface of a transparent film;
applying at least first and second conductive bus bars to the transparent film surface over the transparent conductive layer, wherein each of the first and second conductive bus bars extends from a first end of the transparent conductive layer to a second end of the transparent conductive layer;
laminating an optically clear adhesive (OCA) layer over the transparent conductive layer and the first and second conductive bus bars;
providing a liquid crystal (LC) cell that includes front and rear transparent plates arranged parallel to each other, front and rear transparent conductive layers respectively formed on inner surfaces of the front and rear transparent plates, and a liquid crystal material sealed between the front and rear transparent conductive layers;
laminating the heater directly to the rear transparent plate of the LC cell using the OCA;
laminating a front polarizer having a first polarizing axis to the front transparent plate of the LC cell; and
laminating a rear polarizer having a second polarizing axis to the transparent film of the heater, wherein the first polarizing axis is different than the second polarizing axis.

16. A method as set forth in claim 15, further including:
securing a backlight to the rear polarizer.

17. A method, comprising:
providing a heater including a transparent film, a transparent conductive layer formed on a surface of the transparent film, first and second spaced bus bars disposed over the transparent film, and an optically clear adhesive (OCA) disposed over the transparent conductive layer and the first and second bus bars;
providing a liquid crystal (LC) cell that includes front and rear transparent plates arranged parallel to each other, front and rear transparent conductive layers respectively formed on inner surfaces of the front and rear transparent plates, and a liquid crystal material sealed between the front and rear transparent conductive layers; and
laminating the heater directly to the rear transparent plate of the LC cell using the OCA.

18. A method as set forth in claim 17, further including:
laminating a front polarizer having a first polarizing axis to the front transparent plate of the LC cell; and
laminating a rear polarizer having a second polarizing axis to the transparent film of the heater, wherein the first polarizing axis is different than the second polarizing axis.

19. A method as set forth in claim 17, further including:
securing a backlight to the rear polarizer.

20. A method as set forth in claim 17, wherein the transparent film includes one of comprises a cellulose triacetate (TAC) or a cyclic olefin polymer (COP).

* * * * *